US007480970B2

(12) United States Patent
Meyer et al.

(10) Patent No.: US 7,480,970 B2
(45) Date of Patent: Jan. 27, 2009

(54) MACHINE FOR MACHINING OPTICAL WORKPIECES, IN PARTICULAR PLASTIC SPECTACLE LENSES

(75) Inventors: Urs Meyer, Lenzburg (CH); Marc Savoie, Wetzlar (DE)

(73) Assignee: Satisloh AG, Baar (CH)

( * ) Notice: Subject to any disclaimer, the term of this patent is extended or adjusted under 35 U.S.C. 154(b) by 0 days.

(21) Appl. No.: 11/809,650

(22) Filed: Jun. 1, 2007

(65) Prior Publication Data

US 2007/0277357 A1 Dec. 6, 2007

(30) Foreign Application Priority Data

Jun. 6, 2006 (DE) ....................... 10 2006 026 524

(51) Int. Cl.
*B23P 23/00* (2006.01)

(52) U.S. Cl. ........................... 29/27 C; 82/129; 82/132; 82/904

(58) Field of Classification Search ................. 29/27 C, 29/27 R; 82/129, 132, 904
See application file for complete search history.

(56) References Cited

U.S. PATENT DOCUMENTS

| | | | | |
|---|---|---|---|---|
| 2,367,841 | A * | 1/1945 | Monroe | 407/54 |
| 5,313,694 | A * | 5/1994 | Yonemoto et al. | 29/27 R |
| 5,938,381 | A | 8/1999 | Diehl et al. | |
| 6,523,443 | B1 | 2/2003 | Hof et al. | |
| 7,032,586 | B1 * | 4/2006 | Lindsay | 125/30.01 |
| 7,036,408 | B2 * | 5/2006 | Savoie et al. | 82/1.11 |
| 7,036,931 | B2 | 5/2006 | Lindacher et al. | |
| 7,063,422 | B2 | 6/2006 | Lindacher | |
| 7,230,198 | B2 | 6/2007 | Cok et al. | |
| 7,237,894 | B2 | 7/2007 | Lindacher | |
| 7,278,192 | B2 | 10/2007 | Schaefer | |

(Continued)

FOREIGN PATENT DOCUMENTS

DE 1 827 595 U 3/1961

(Continued)

OTHER PUBLICATIONS

Design and Testing of a Fast Tool Servo for Diamond Turning, S.R. Patterson and E.B. Magrab, Precision Engineering, Jul. 1985, vol. 7, No. 3, 6 pages.

(Continued)

*Primary Examiner*—Erica E Cadugan
(74) *Attorney, Agent, or Firm*—Reising, Ethington, Barnes, Kisselle, P.C.

(57) ABSTRACT

A machine for machining optical workpieces, is equipped with a workpiece spindle, by which the workpiece can be rotatably driven about a workpiece rotation axis, and with a first fast-tool assembly, by which a turning cutter is movable in the direction of the workpiece and away from it. The workpiece spindle and the first fast-tool assembly are also movable relative to each other in a direction transverse to the workpiece rotation axis. Provided adjacent to and preferably in parallel configuration with the first fast-tool assembly is a second fast-tool assembly with a graver which has its end that faces the workpiece being essentially punctiform. The graver is movable by the second fast-tool assembly, in the direction of the workpiece and away from it, so that a marking of any geometry can be produced on the latter in the same span.

7 Claims, 7 Drawing Sheets

U.S. PATENT DOCUMENTS

| | | | | |
|---|---|---|---|---|
| 7,278,771 | B2 | 10/2007 | Campbell | |
| 7,293,487 | B2 | 11/2007 | Campbell et al. | |
| 7,328,638 | B2 | 2/2008 | Gardiner et al. | |
| 7,373,706 | B2 | 5/2008 | Savoie | |
| 7,384,143 | B2 | 6/2008 | Hall et al. | |
| 2003/0183050 | A1 * | 10/2003 | Savoie et al. | 82/11.3 |
| 2004/0049902 | A1 * | 3/2004 | Hagstrom | 29/26 A |
| 2006/0260447 | A1 | 11/2006 | Savoie et al. | |
| 2007/0094857 | A1 | 5/2007 | Savoie | |
| 2008/0098584 | A1 * | 5/2008 | Meyer et al. | 29/27 C |

FOREIGN PATENT DOCUMENTS

| | | | | |
|---|---|---|---|---|
| DE | 35 34 920 | C2 | | 5/1987 |
| DE | 3534920 | A1 | * | 5/1987 |
| EP | 849038 | A2 | * | 6/1998 |
| GB | 1 362 484 | | | 8/1974 |
| WO | WO 99/33611 | A1 | | 7/1999 |
| WO | WO 02/06005 | A1 | | 1/2002 |
| WO | WO 2006/015761 | A1 | | 2/2006 |

OTHER PUBLICATIONS

Toric Contact Lenses on Demand, Len Chaloux, Optical World, Feb. 1996, 3 pages.

Design of a Long Range Fast Tool Servo System Using Magnetic Servo Levitation, Stancil, Gutierrez and Ro , American Society for Precision Engineering, vol. 12, 4 pages, date unknown.

A New Hybrid Concept for a Long Stroke Fast-Tool-Servo System, M. Weck, H. Oezmeral, K. Mehikopp, T. Terwei, American Society for Precision Engineering, vol. 12, 4 pages, date unknown.

A Long Stroke Fast-Tool-Servo with Air Bearings, M. Weck, H. Oezmeral, K. Mehikopp, T. Terwei, Fraunhoffer-Institue fur Produktionstechnologie, 4 pages, date unknown.

Actual Fast-Tool-Servo-Systems, H. Ozmeral and M. Weck, Fraunhofer Institut Produktionstechnologie, 10 pages, date unknown.

Forschungsgemeinschaft Ultraprazisionstechnik UPT, Fraunhofer Institut Produktionstechnologie, 2 pages, date unknown.

Ultrafast Tool Servos for Diamond Turning, X. D. L and D.L. Trumper, Massachusetts Institute of Technology, Cambridge, Massachusetts, 6 pages, date unknown.

Ophthalmic Optics—Uncut Finished Spectacle Lenses, Part 2, Specifications for Progressive Power lenses, International Standard, ISO 8980-2, Feb. 1, 1996, 11 pages.

* cited by examiner

MACHINE FOR MACHINING OPTICAL WORKPIECES, IN PARTICULAR PLASTIC SPECTACLE LENSES

TECHNICAL FIELD

The present invention relates to a machine for machining optical workpieces, in particular plastic spectacle lenses.

BACKGROUND OF THE DISCLOSURE

In the machining of plastic spectacle lenses, a spectacle-lens blank, injection-molded in plastic, is normally present, exhibiting a standardised, finish-machined convex front surface of e.g. a spherical, aspherical or progressive shape. The generally concave back or prescription surfaces are provided by cutting operations with a spherical, aspherical, toroidal, atoroidal, progressive or free-form geometry (progressive surfaces), depending on the desired optical effect. The typical conventional sequence in back-surface processing, after the blocking of the spectacle-lens blank with its front surface on a blocking piece, provides for a milling or turning machining process in order to produce the optically active shape, generally followed by a fine-grinding or polishing process to achieve the necessary surface quality, which, however, may be dispensable in the case of a turning-machined spectacle lens.

Also used for the turning process in the prior art are fast-tool turning machines, in which a turning cutter (lathe tool) can be moved high-dynamically, either with linear reciprocation (see e.g. U.S. Patent No. 7,036,408 or the generic U.S. Patent No. 6,523,443) or with rotation (see e.g. WO-A-99/33611), so that non-rotationally-symmetrical lens surfaces with very good surface qualities can be produced by the turning process.

Following production of the spectacle-lens surface with the desired optical effect, the spectacle lens has to be provided with an identifier, in particular for subsequent processing, specifically the edging of the spectacle lens for matching to the particular spectacle frame. For example, a progressive spectacle lens in accordance with DIN EN ISO 8980-2 must be permanently marked with at least the following information: a) alignment marking; this must comprise at least two markings at a distance of 34 mm, and be located symmetrically relative to a vertical plane through the fitting point or the prism reference point; b) indication of the near-vision magnification in dioptres; and c) indication of the manufacturer or supplier or trade name or trade mark. This standard also recommends, as optional, non-permanent identifiers, further alignment markings, for the distance-vision reference point, for the near-vision reference point, for the fitting point and the prism reference point.

Whereas the permanent identifiers are normally produced by permanent engravings, of which the functional engravings, i.e. the engravings required by the optician for the alignment and assignment of the particular spectacle lens, are generally executed so finely that they cannot be seen with the naked eye in normal light, the non-permanent identifiers are executed by e.g. a temporary lens stamp, which is removed again in the course of the finish-machining of the spectacle lens.

In addition, many spectacle lens manufacturers also offer permanent, individual engravings on the spectacle lens, e.g. engraving of the initials of the spectacle-lens supplier, which is intended to emphasise the mass production of the spectacle lenses and is applied at a location on the spectacle lens where it does not impair vision.

The application of permanent engravings is generally undertaken in an engraving machine separate from the actual machining unit, in which engraving machine a rotatably driven engraving tool with a geometrically determined cutter (milling tool) or a geometrically indeterminate cutter (grinding tool) is guided in a defined machining engagement over the spectacle-lens surface to be marked in order to form the engraving. However, engraving machines are also known in which the engraving is applied to the spectacle lens by laser beam.

In order to avoid the additional use of special diamond tools or high-energy laser radiation in order to apply markings to the spectacle-lens surface, the generic U.S. Patent No. 6,523,443 proposes that these markings be produced directly during the machining process by means of the same tool with which the turning operation takes place, as a result of which all reproducibility problems, which occur on each machine change, are ruled out. For the actual turning operation, this tool must be equipped with a rotary cutter with a defined cutting geometry. With a rotary cutter of this kind, however, only markings comprising fine lines running parallel to the cutting edge can be produced. It would be desirable if in this case, as with the known engraving machines, graphical symbols such as letters, numbers, company logos etc. were reproducible in detail.

SUMMARY OF THE INVENTION

Starting from the basis of the prior art according to U.S. Patent No. 6,523,443, the object of the invention is to provide a machine for machining optical workpieces, in particular plastic spectacle lenses, with a fast-tool assembly by means of which finely detailed markings as required can also be applied to the workpiece without the workpiece having to be unclamped or reclamped.

According to the invention, in a machine for machining optical workpieces, in particular plastic spectacle lenses, which machine is equipped with a workpiece spindle, by which means the workpiece can be rotatably driven about a workpiece rotation axis, and with a first fast-tool assembly, by which means a turning cutter is movable in the direction of the workpiece and away from it, wherein the workpiece spindle and the fast-tool assembly are, in addition, movable relative to each other in a direction transverse to the workpiece rotation axis, provided adjacent to and preferably in parallel configuration with the first fast-tool assembly is a second fast-tool assembly with a graver, the end of which that faces the workpiece is essentially punctiform, wherein the graver is movable high-dynamically, by means of the second fast-tool assembly, in the direction of the workpiece and away from it, so that, in particular through needling engagement of the graver with the workpiece, a marking or engraving can be produced on the latter.

With the second fast-tool assembly, located adjacent to or parallel with the first fast-tool assembly, which second fast-tool assembly actuates the graver, the workpiece can thereby be provided, in the operating space of one and the same machining unit, and directly following on timewise from the actual turning operation, with a permanent engraving without the workpiece having to be reclamped on a separate engraving machine for the purpose, which favors a rapid and precise machining process. Since a tool differing from the turning cutter is used here, namely the graver, the end of which facing the workpiece is essentially punctiform, the producible geometry of the marking is, unlike the case of the generic prior art, not limited by the geometry of the turning cutter. In particular by needling engagement of the pointed graver with the workpiece, i.e. an engraving operation during which the graver strikes the workpiece in quick succession, like a woodpecker against a tree, very finely detailed engravings can be produced. Furthermore, with the machine according to the invention, the engraving of the workpiece does not cause any wear on the turning cutter, and likewise the turning operation on the workpiece does not cause any wear on the graver, which increases the tool life as compared with the generic prior art. This is significant in particular against the background that a blunt graver may only push the material of the workpiece away during the engraving process, but the material then gradually returns, which can lead to an undesirable "ageing" or "fading" of the engraved image, above all with the plastic material "CR39".

In an advantageous embodiment of the machine, in which the graver is movable by means of the second fast-tool assembly in a fast-tool movement plane whilst the workpiece spindle and the second fast-tool assembly are movable relative to one another in a plane which contains the workpiece rotation axis, the fast-tool movement plane may be positioned obliquely at a setting angle relative to the plane containing the workpiece rotation axis. Owing to this oblique positioning of the movement plane of the fast tool in such a way that an angle of predetermined value exists between this movement plane and the plane containing the workpiece rotation axis—consequently the workpiece rotation axis of the workpiece spindle—an extremely precise level setting of the essentially punctiform end of the graver facing the workpiece can, in conjunction with the feed (relative) motion of the workpiece spindle in the plane containing the workpiece rotation axis—more precisely in the direction of the workpiece spindle—which takes place on the machine in any event, be achieved on the workpiece rotation axis of the workpiece spindle without level movements of the graver relative to the fast-tool assembly and corresponding mechanical setting systems for the level adjustment of the graver being necessary for this purpose. The extent of the feed (relative) movement of the workpiece spindle in the direction of its axis, and thereby the level equalisation between the workpiece rotation axis of the workpiece spindle and the working point of the graver achieved as a result, depends on the sine function of the predetermined angle. All this is favorable to achieving a high positional accuracy of the marking on the workpiece using simple means; in the case of e.g. a free-form surface, the engraving is the primary marking on the surface and therefore must be applied with great accuracy, wherein the permitted tolerance lies at around +/−0.2 mm.

In view of the fine sensitivity of the level adjustment of the end of the graver facing the workpiece relative to the workpiece rotation axis, it is preferred for the fast-tool movement plane and the plane containing the workpiece rotation axis to enclose a setting angle of between 2° and 10°.

Although it is preferred, in particular in the interests of the simplest possible mathematics in controlling the movement axes, that the graver can be advanced with positioning control in the axial direction by means of the second fast-tool assembly—just like the turning cutter with the first fast-tool assembly—the fundamental idea of the present invention, namely the parallel arrangement of a second fast-tool assembly carrying a graver in addition to the first fast-tool assembly for the turning cutter, can also be realised on a machine with a rotary fast-tool assembly for the turning cutter, as known from, for example, WO-A-99/33611, wherein a second rotary fast-tool assembly would then be used for the graver. In this case, the common fast-tool movement plane would run normal to the swivel axes of the rotary fast-tool assemblies.

Although the tip of the graver may perfectly well also be of pyramidal design with e.g. a triangular or square base area, it is preferable in the interests of simplicity of resharpening the graver for the graver to be equipped with a tip that tapers essentially conically towards its end facing the workpiece.

Finally, depending on the material of the workpiece to be marked, various materials, e.g. hardened steel, are conceivable for the tip of the graver. In the interests of the longest possible graver life in the machining of plastic spectacle lenses, it is, however, preferred for the tip forming the end of the graver facing the workpiece to comprise metal carbide.

BRIEF DESCRIPTION OF THE DRAWINGS

The invention will be further described below, using a preferred embodiment example, with reference to the enclosed schematic drawings. The drawings show.

DETAILED DESCRIPTION OF THE PREFERRED EMBODIMENT

Figure 1:
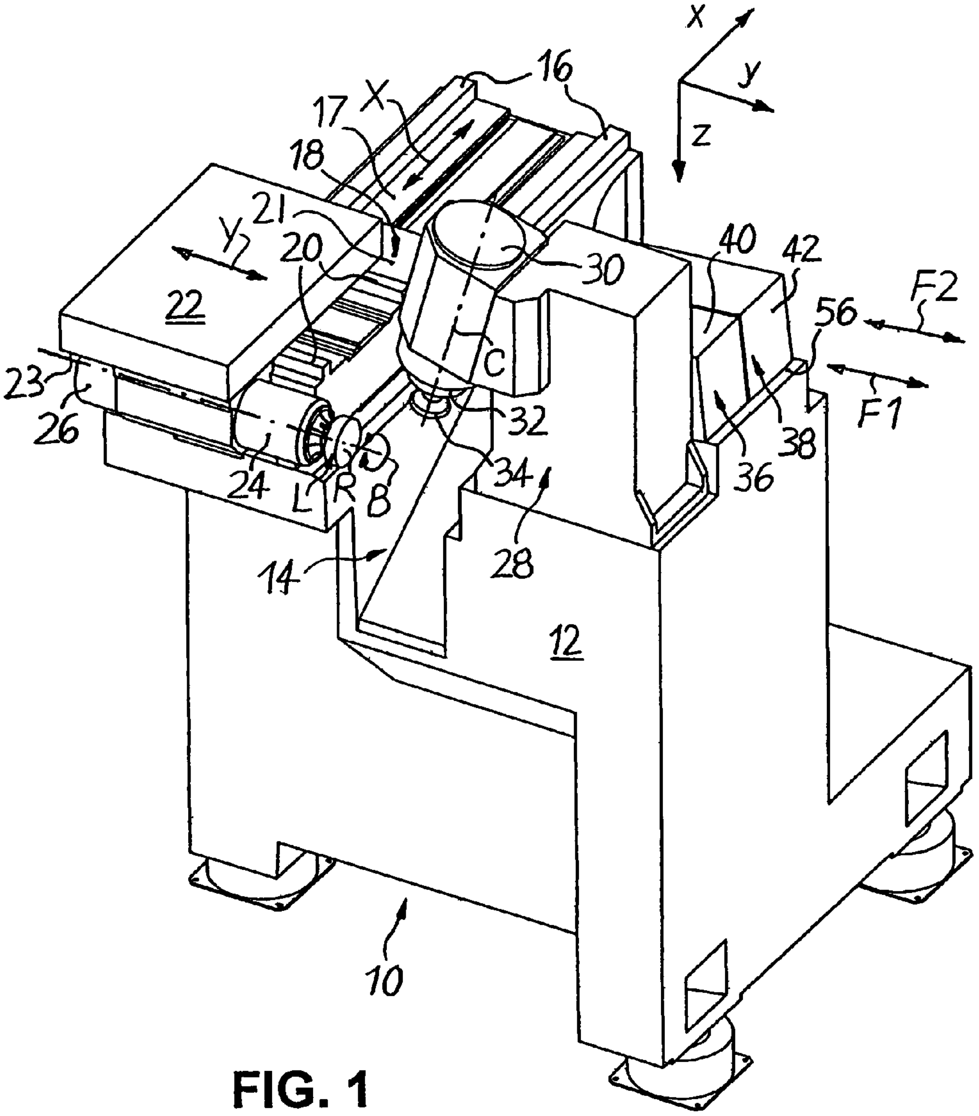
FIG. 1 is a perspective view, from obliquely in front/above, of a machine according to the invention for machining optical workpieces, namely plastic spectacle lenses, which, in terms of tools, is equipped with a milling unit and two fast-tool assemblies.

FIGS. 1 to 5 show, in schematic representation, a CNC-controlled machine 10, in particular for the surface machining of spectacle lenses L made of plastic in a rectangular Cartesian co-ordinate system, in which the lower-case letters x, y, z designate the latitudinal direction (x), the longitudinal direction (y) and the elevation direction (z) of the machine 10. The machine 10 as such, without the engraving function, was described in prior commonly owned U.S. Patent Publication 2006/0260447.

According to FIGS. 1 to 5, the machine 10 is equipped with a machine base 12, which defines a machining area 14. Affixed on a (in FIG. 1) upper mounting surface 17 of the machine base 12, to the left side in FIG. 1 of the machining area 14, are two guide rails 16, which extend parallel with one another in the (horizontal) latitudinal direction x. An X-slide 18, which is adjustable, under CNC positional control, in both directions of an X-axis by means of assigned CNC drives and control components (not shown), is moveably mounted on the guide rails 16.

Two further guide rails 20, which extend in the (likewise horizontal) longitudinal direction y parallel with one another and normal to the guide rails 16, are fastened on (in FIG. 1) an upper mounting surface 21 of the X-slide 18. In a cross-table arrangement, a Y-slide 22 is moveably mounted on the guide rails 20, and is adjustable, under CNC positional control, in both directions of a Y-axis by means of assigned CNC driving and control components (also not shown).

Fastened on a (in FIGS. 1 to 4) lower mounting surface 23 of the Y-slide 22 is a workpiece spindle 24, which can be rotatably driven about a workpiece rotation axis B by means of an electric motor 26 under CNC control in terms of speed and rotation angle. The workpiece rotation axis B is aligned with the Y-axis. The spectacle lens L, blocked on a blocking element, is applied in a manner known per se to the workpiece spindle 24, or more precisely to its end projecting into the machining area 14, for the machining of, in particular, the prescription surface R of the spectacle lens L, in a manner such that it can rotate coaxially with the workpiece spindle 24.

It is apparent from the above description that the workpiece spindle 24 is moveable, with CNC positional control, by means of the cross-table arrangement (X-slide 18, Y-slide 22), in an X-Y plane, which contains the workpiece rotation axis B and with which the mounting surfaces 17, 21 and 23 are parallel, whilst the spectacle lens L can be rotated about the workpiece rotation axis B under CNC control in terms of speed and rotation angle.

Mounted on the machine base 12 on the (in FIG. 1) right-hand side of the machining area 14 is a milling unit 28, as known in general terms in respect of its structure and operation from commonly owned U.S. Pat. No. 5,938,381. The milling unit 28 is equipped with a milling spindle 32, which can be driven about a milling rotation axis C, under speed control, by means of an electric motor 30, on the end of which milling spindle projecting into the machining area 14 is fitted a milling tool 34.

By means of the milling unit 28, a milling process can be executed on the spectacle lens L, this—according to the teaching of U.S. Pat. No. 5,938,381—comprising a plunging work operation in which the milling tool 34, rotating under speed control about the milling-cutter rotation axis C, and the spectacle lens L, rotating under rotation-angle control about the workpiece rotation axis B, are moved relative to one another, under positional control, in at least one of the two axial directions X and Y, in a manner such that the cutters of the milling tool 34 produce an annular trough-shaped recess, at least in the area of the outer edge of the spectacle lens L, before the milling tool 34 is guided, in a shaping work step, along a spiral-shaped path over the spectacle lens L from the exterior to the interior by controlling the movement path of the spectacle lens L in the X-Y axes, i.e. in the X-Y plane, in order to remove further material. Optional, albeit preferred, accompanying work processes along with this milling process are the edge machining and facetting of the spectacle lens L. In the case of edging, a (pre)machining of the spectacle-lens blank may be undertaken by means of the rotating milling tool 34, e.g. on a peripheral contour, which already largely corresponds with the peripheral contour predefined by the shape of the spectacle frame, whilst in the case of faceting, the upper or inner peripheral edge of the spectacle-lens blank can be beveled by means of the rotary milling tool 34. These process steps have long been familiar to the person skilled in the art, so there is no need to go further into them at this point.

Figure 3:
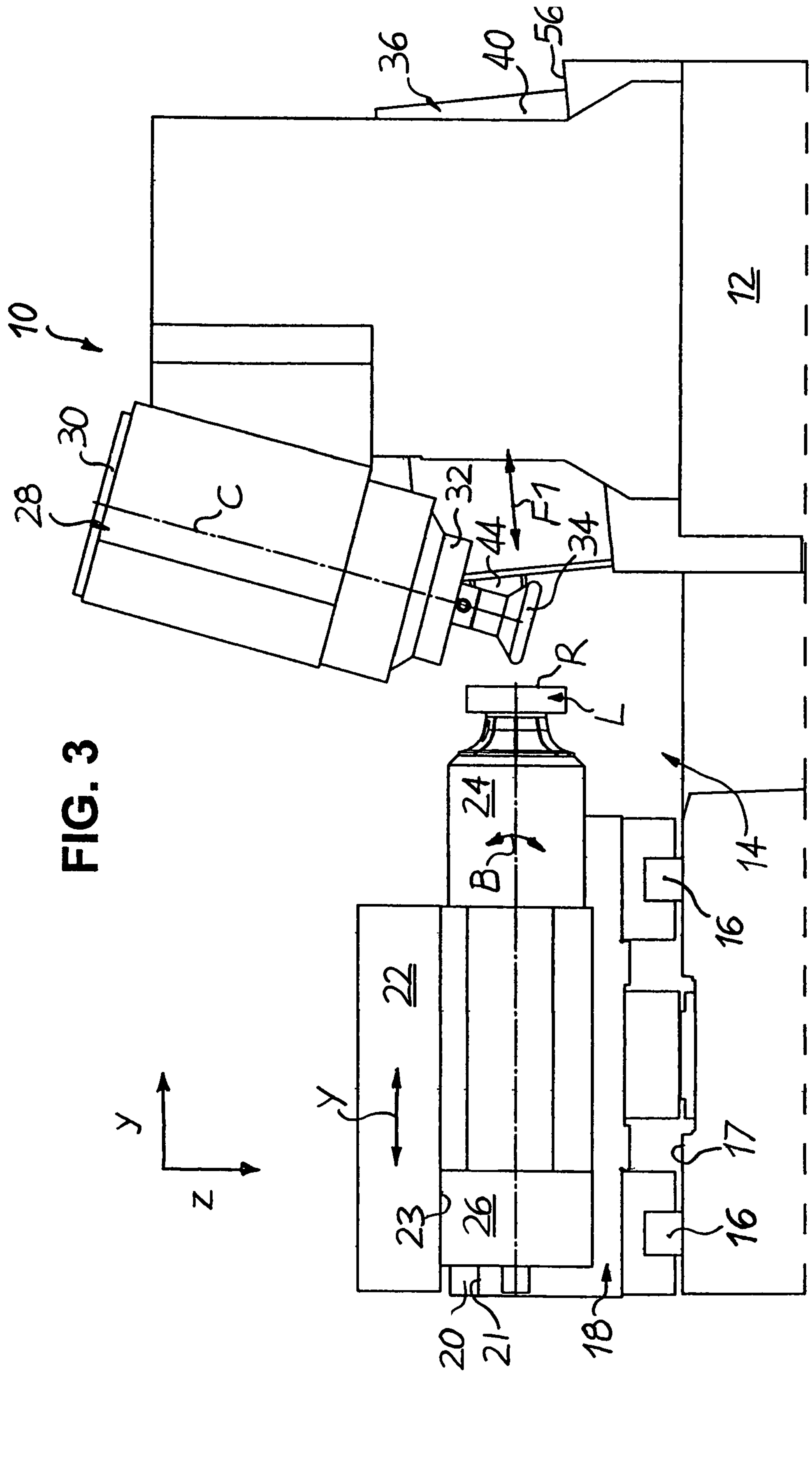
FIG. 3 is a front view of the machine according to FIG. 1, cut away at the bottom.
Figure 4:
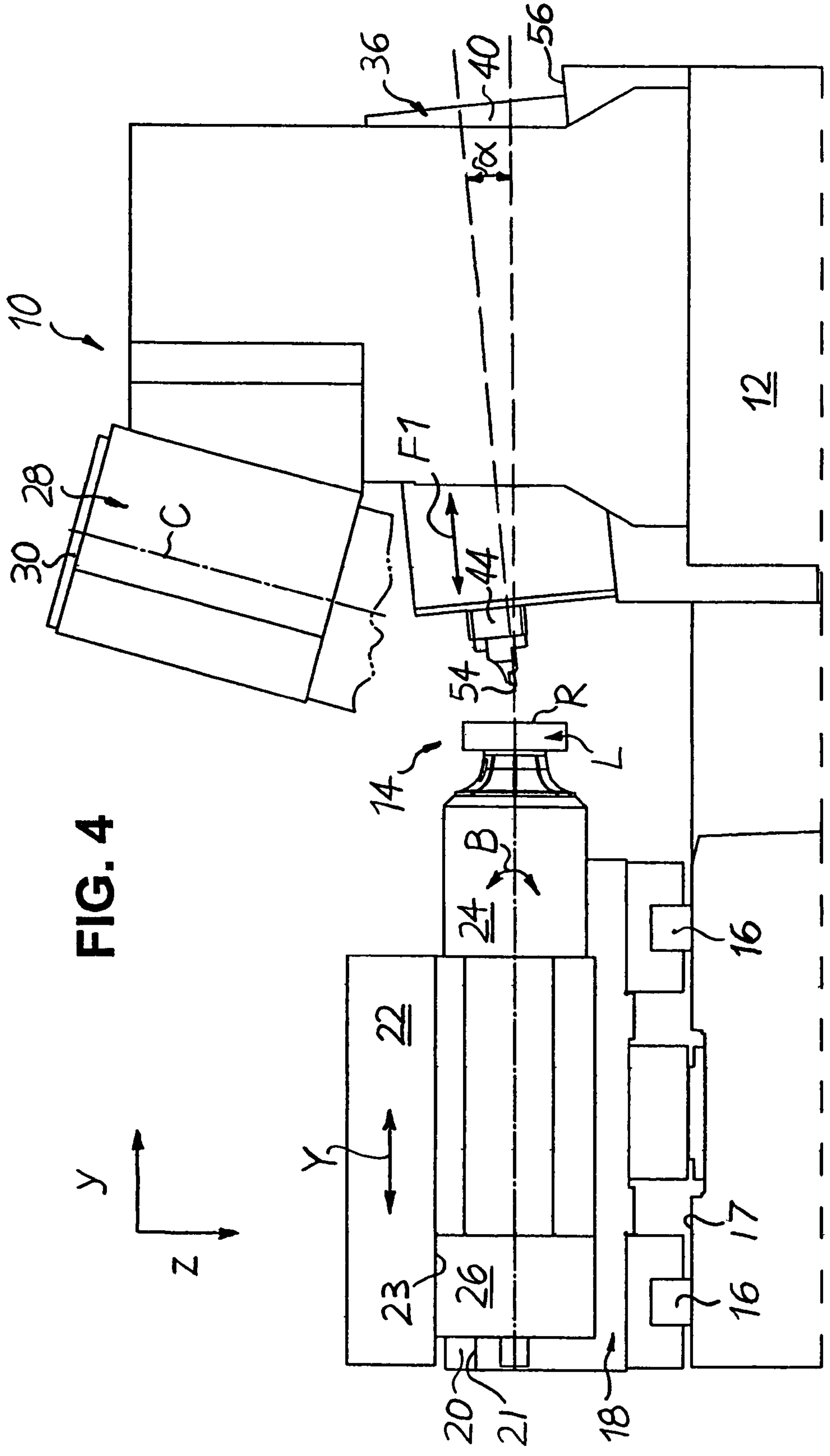
FIG. 4 is a front view of the machine according to FIG. 1, cut away at the bottom, which differs from the view in FIG. 3 in that a milling spindle of the milling unit is shown partially cut away in order to free the view of the fast-tool assembly located behind it.
Figure 5:
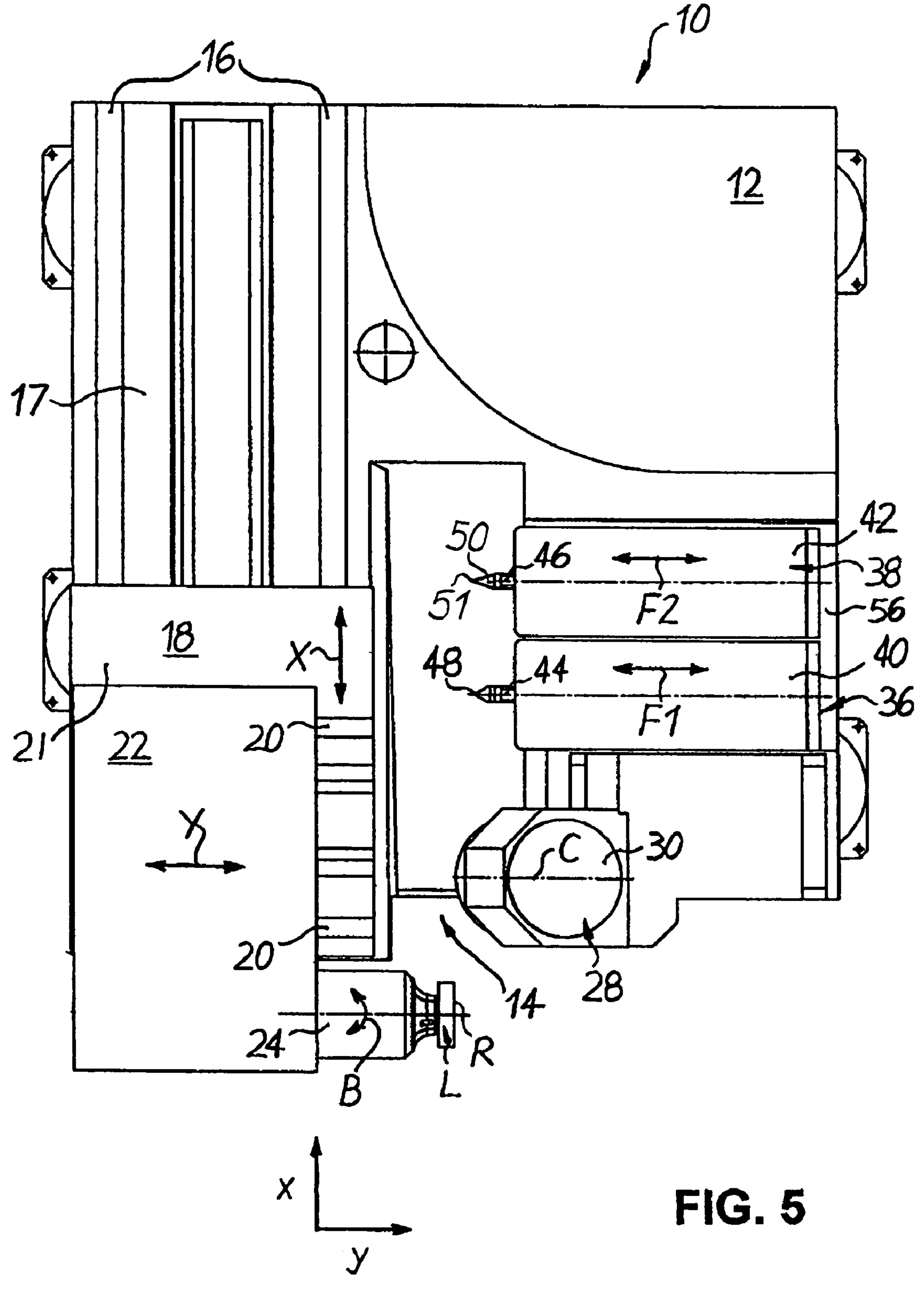
FIG. 5 is a plan view of the machine according to FIG. 1 with direction of viewing from above in FIGS. 3 and 4.

Provided in parallel arrangement in FIGS. 1, 3 and 4, behind the milling unit 28 are (at least) two fast-tool assemblies 36, 38 (more than two fast-tool assemblies are, in principle, also conceivable). As is known from e.g. U.S. Pat. No. 7,036,408, each fast-tool assembly 36, 38 is equipped with an actuator 40, 42 with a shuttle 44, 46 assigned to it in each case. The internal structure of the fast-tool assemblies 36, 38 shown here is described in detail in prior commonly owned U.S. Patent Publication U.S 2007/0094857. Whilst the shuttle 44 of the first fast-tool assembly 36 is axially moveable by means of the actuator 40 in both directions of a fast-tool axis F1, the shuttle 46 of the second fast-tool assembly 38 is axially moveable by means of the actuator 42 in both directions of a second fast-tool axis F2, which is parallel with the first fast-tool axis F1. The position and/or stroke of the shuttles 44, 46 are hereby controllable by CNC independently of one another. As shown in FIG. 5, the fast-tool axis FI, the fast-tool axis F2, the Y-axis and the workpiece rotation axis B viewed from above run in the same direction. However, viewed from the front according to FIGS. 3, 4 and 6, the direction of the Y-axis and the workpiece rotation axis B on the one hand differ from the direction of the fast-tool axis F1 and the fast-tool axis F2 on the other, which will be explained in greater detail below.

Whereas the shuttle 44 of the first fast-tool assembly 36, which is located closer to the milling unit 28, bears at its end projecting into the machining area 14 a turning cutter 48, which is fastened, in a manner not shown in greater detail here, to the shuttle 44, preferably rigidly (by contrast with adjustably), the shuttle 46 of the second fast-tool assembly 38 carries at its end projecting into the machining area 14 a graver 50, which is described in greater detail below, the end 51 of which facing the spectacle lens L is essentially punctiform. As a result, both the turning cutter 48 and the graver 50 are moveable in a fast-tool movement plane (X-F1 plane and X-F2 plane respectively).

Figure 6:
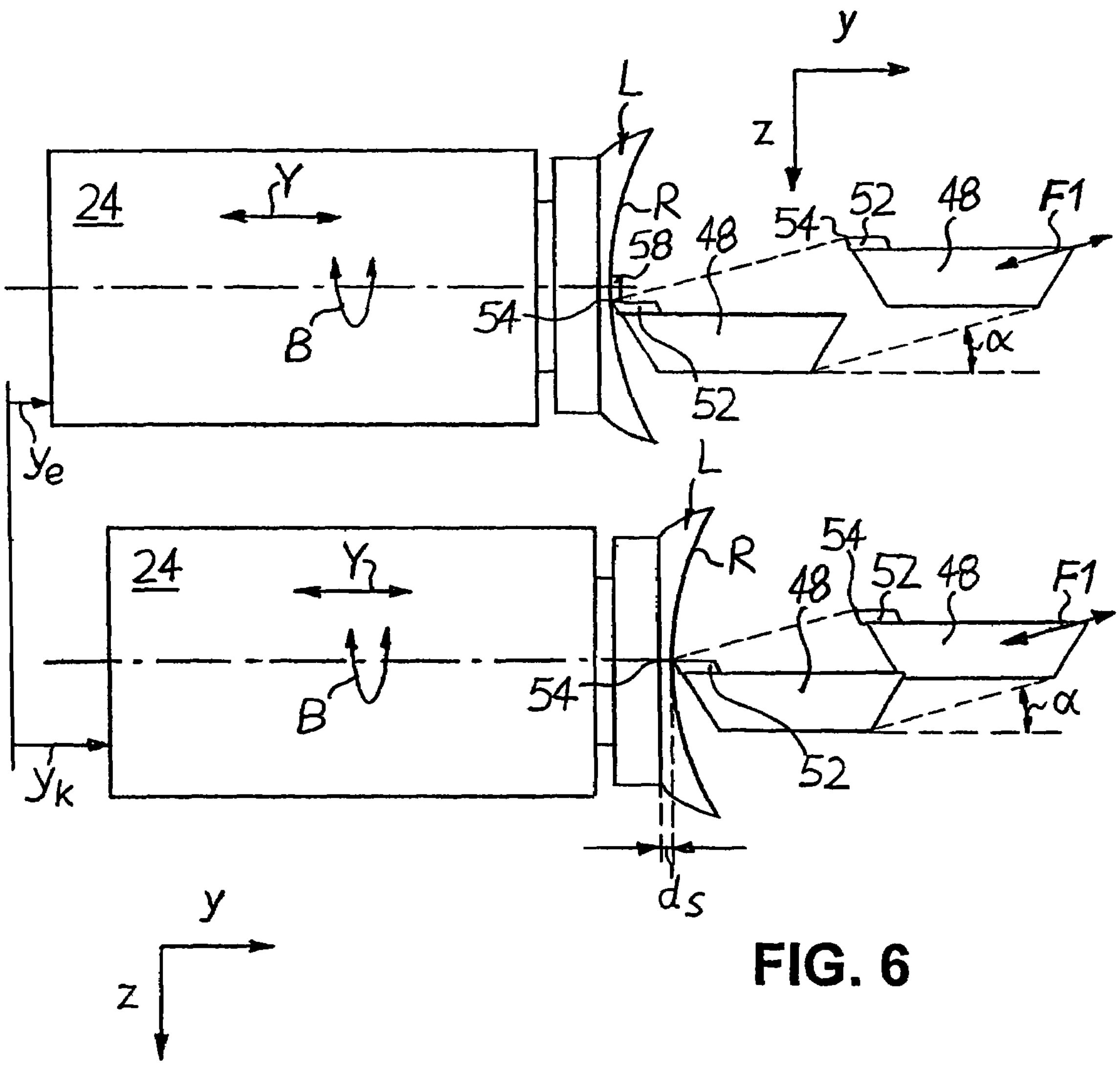
FIG. 6 are schematic front views of a workpiece spindle of the machine according to FIG. 1 on which is mounted a spectacle lens shown in cross-section, which is being machined by a turning cutter of the fast-tool assembly, wherein, in the upper part of FIG. 6, a defective level adjustment of the turning cutter relative to the workpiece rotation axis of the workpiece spindle is illustrated, whilst, in the lower part of FIG. 6, a correct level adjustment of the turning cutter relative to the workpiece rotation axis is shown, in order to illustrate the principle of level calibration of the turning cutter and graver on the machine shown in FIGS. 1 to 5.

According in particular to FIG. 6, applied to the turning cutter 48, separably or as a coating, is a cutting lamina 52, which forms a cutting edge 54, and which, depending on the particular requirements, in particular specifically for the material to be machined, may comprise polycrystalline diamond, CVD, natural diamond or metal carbide, with or without anti-wear coating.

By means of the first fast-tool assembly 36, the prescription surface R of the spectacle lens L, pre-machined by the milling unit 28, can be rotatably post-machined, which again takes place with control of the movement of the spectacle lens L in the X-axis and, where applicable, in the Y-axis, i.e. in the X-Y plane, with control of the movement of the machining turning cutter 48 in the F1-axis, i.e. in the X-F1 plane, and with control of the rotary movement of the spectacle lens L about the workpiece rotation axis B. The fast-tool assemblies 36 and 38 can hereby be activated in a manner such that the shuttle 46 not involved in the turning operation moves in the opposite direction to the shuttle 44 involved in the turning operation, so that the shuttles oscillate virtually in opposition or in push-pull operation, in order, by mass compensation, to prevent interfering oscillations from being transmitted into the machine base 12, or to reduce them, as disclosed in U.S. Pat. No. 7,036,408. As a result, surface qualities virtually corresponding to the surface quality achievable with conventional polishing methods can be achieved with turning operations.

As already discussed in more general terms above, the fast-tool assemblies 36 and 38 are mounted on a mounting surface 56 of the machine base 12, which mounting surface is tilted or adjusted by an angle α relative to the mounting surfaces 17, 21 and 23 for the cross-table arrangement (X-slide 18, Y-slide 22) and workpiece spindle 24 respectively, so that the fast-tool movement plane (X-F1 plane or X-F2 plane) is positioned obliquely relative to the movement plane (X-Y plane) of the workpiece spindle 24, which contains the workpiece rotation axis B. In the embodiment example shown, this angle α equals roughly 5°, but may also equal somewhat more or somewhat less, e.g. in the range of 2° to 10°.

Owing to this measure, an adjustment of the turning cutter 48 by means of the fast-tool assembly 36 in the F1-axis, or an adjustment of the graver 50 by means of the fast-tool assembly 38 in the F2-axis has the result that the movement of the cutting edge 54 of the turning cutter 48, or of the essentially punctiform end 51 of the graver 50, obtains two movement components, namely a movement component in the longitudinal direction y of the machine 10 and a movement component in the elevation direction z of the machine 10. The latter can be used to align the working point of the cutting edge 54 of the turning cutter 48 or the end 51 of the graver 50 with the workpiece rotation axis B of the workpiece spindle 24. Level errors or deviations of the cutting edge 54 of the turning cutter 48 in the elevation direction z can hereby be compensated; and, for the essentially punctiform end 51 of the graver 50, a level reference position in which the end 51 of the graver 50 lies in the (horizontal) plane containing the workpiece rotation axis B can also be found or set equally simply. A procedure of this kind is illustrated for the turning cutter 48 in FIG. 6.

In the upper part of FIG. 6, a defective level adjustment of the turning cutter 48 is shown. Although a relative advance of the workpiece spindle 24 and the turning cutter 48 in the longitudinal direction y takes place in such a way that, at the end of the turning operation (turning cutter 48 shown on the left), the spectacle lens L has a thickness in the longitudinal direction y that corresponds to the desired thickness, i.e. the required end thickness $d_s$ of the spectacle lens L, a surface error remains in the form of a plug 58 on the prescription surface R, shown in exaggerated size in FIG. 6. This surface error is caused by the fact that, at the end of the turning operation, the turning cutter 48, or more precisely its cutting edge 54, does not "hit" the workpiece rotation axis B, but comes to a halt below the workpiece rotation axis B (in the case of a defective axial position $Y_e$ of the workpiece spindle 24: tool 48 is too low at the end of the turning operation). A comparable, conical surface error arises (not shown) if, at the end of the turning operation, the cutting edge 54 of the turning cutter 48 comes to a halt above the workpiece rotation axis B (tool too high).

In the lower part of FIG. 6, a correct level adjustment of the turning cutter 48 relative to the workpiece rotation axis B is shown, in which no central surface error remains on the prescription surface R of the spectacle lens L. To this end, the procedure is as follows: firstly, with a known position of the cutting edge 54 of the turning cutter 48 in the co-ordinate system of the machine 10 and a known setting angle α of the fast-tool axis F1, an axial position $y_k$ of the workpiece spindle 24 in the longitudinal direction y is calculated, at which the working point of the cutting edge 54 of the rotary cutter 48 will come to a stop in the X-Y plane containing the workpiece rotation axis B in the case of a required end thickness $d_s$ of the spectacle lens L to be machined, i.e. will "hit" the workpiece rotation axis B. The workpiece spindle 24 is then brought into the calculated axial position $y_k$ by position-controlled axial displacement or advancing in the Y-axis, whereupon an axial fixing or retaining of the workpiece spindle 24 in the calculated axial position $y_k$ takes place. The spectacle lens L, driven in rotation, can now be machined, under position-controlled transverse advance of the workpiece spindle 24 in the X-axis and position-controlled (F1-axis) feed of the turning cutter 48 in the fast-tool movement plane, i.e. the X-F1 plane, until the required end thickness $d_s$ is achieved on the machined spectacle lens L. At the end of the turning operation, the cutting edge 54 of the turning cutter 48 now "hits" the workpiece rotation axis B automatically.

The procedure may alternatively be that the workpiece spindle 24 is not fixed in the Y-axis, but, in addition to the movement of the fast-tool assembly 36 in the F1-axis, a geometry-generating movement of the workpiece spindle 24 in the Y-axis takes place, or more precisely, the geometry generation is distributed over the Y-axis and the F1-axis in a manner such that the Y-axis is responsible for the slower movement portion, while the F1-axis adopts the faster movement portion. The advantage of this procedure, which is described in greater detail in prior German patent application 10 2005 021 640.4 of the same applicant, is, in particular, that a fast-tool assembly 36 can be used with a lower stroke and therefore greater rigidity, and, in addition higher machining speeds can be achieved.

Albeit that, in the embodiment example described, the X-Y plane runs horizontally, whereas the X-F1 plane and the X-F2 plane are tilted away from the horizontal by an angle α, the circumstances encountered may well also be the reverse, with a horizontally running X-F1 plane and X-F2 plane, and an X-Y plane set at an angle relative to the horizontal. A configuration in which both the X-Y plane and the X-F1 plane/X-F2 plane are tilted away from the horizontal, although by different angular amounts, is also conceivable.

Figure 2:
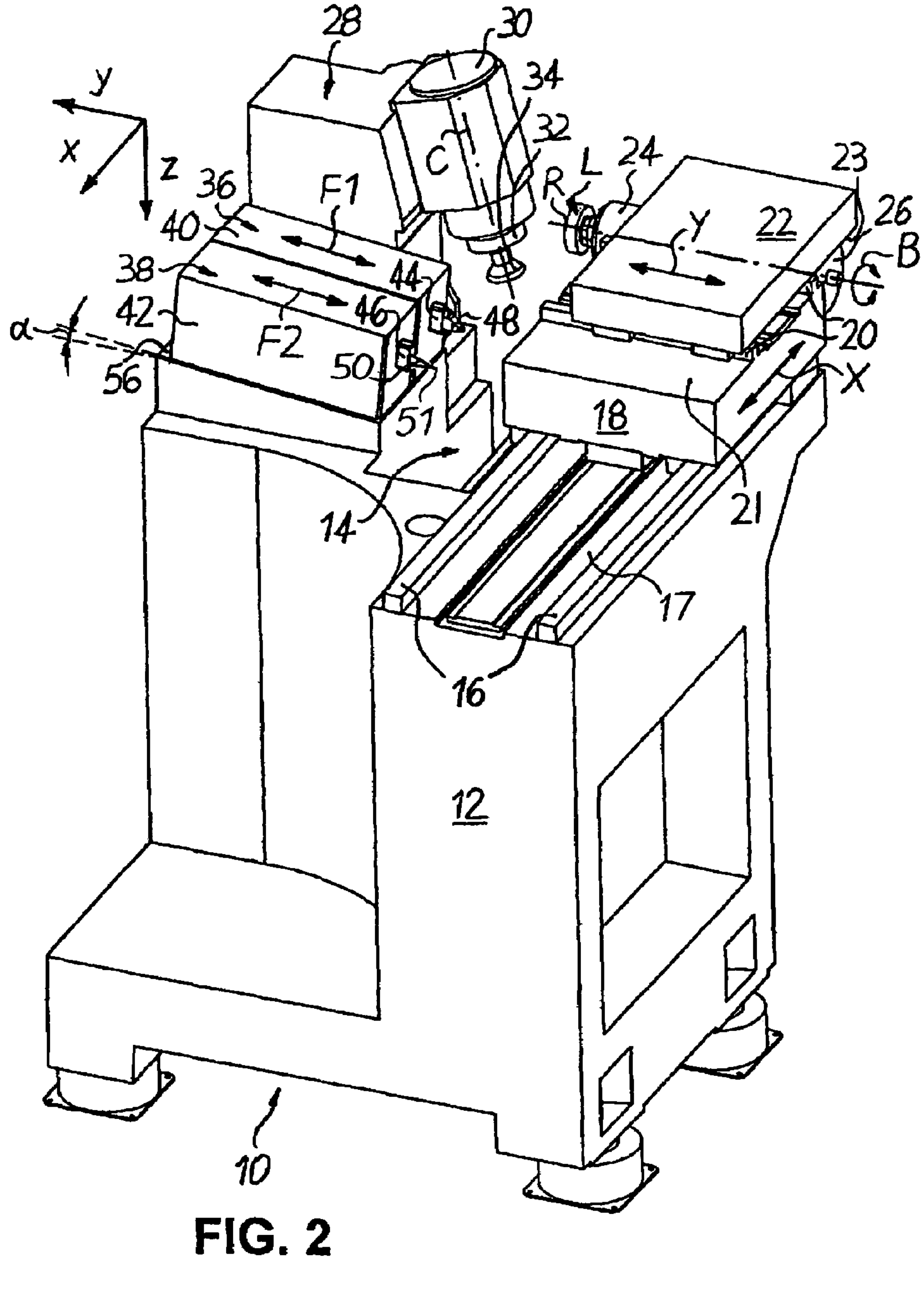
FIG. 2 is a perspective view, from obliquely behind/above, of the machine according to FIG. 1.
Figure 7:
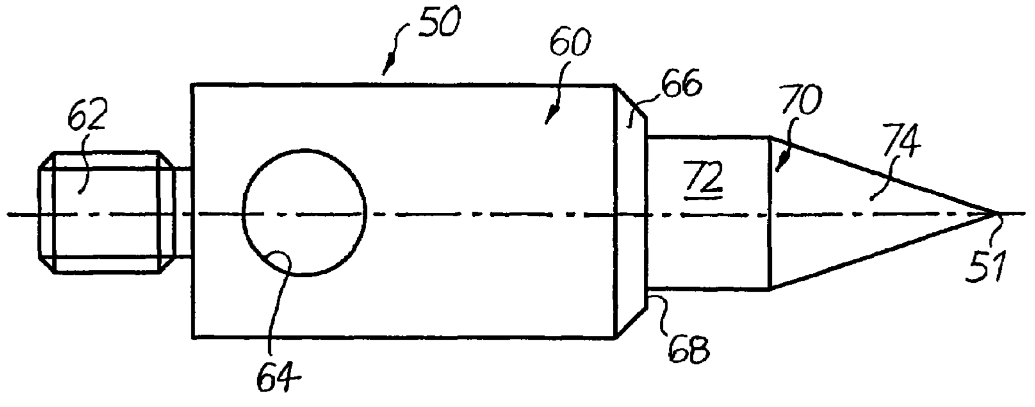
FIG. 7 is an enlarged side view of the machine's graver, shown only schematically in FIGS. 2 to 5, in a state of separation from the machine.

FIG. 7 shows the graver 50, which was shown only schematically in FIGS. 2 and 5, in detail, in a larger-than-life scale. The graver 50 has a cylindrical steel body 60, which is equipped on its (in FIG. 7) left-hand side with a centrical threaded shoulder 62. By means of the threaded shoulder 62, the graver 50 can be fastened on the shuttle 46 of the second fast-tool assembly 38, to which end the threaded shoulder 62 is screwed into a threaded aperture (not shown) provided on the end face of the shuttle 46, which is complementary to the threaded shoulder 62. In order that it is possible to tighten the graver 50 on the shuttle 46, the body 60 is provided with a transverse aperture 64, through which a tool, e.g. a screwdriver, can be inserted so that a sufficiently great torque can be exerted on the graver 50. Alternatively, the body 60 could also be provided on the external periphery with a key surface. After a conical transition surface 66, the body 60 ends on the (in FIG. 7) right-hand side with a flat end face 68. Extending away from the end face 68 is an end section 70 of the graver 50, which, after a cylindrical fastening section 72, terminates with a point 74, tapering in an essentially conical manner towards the end 51 of the graver 50. Albeit that the end section 70 may be produced from the same material as the body 60 and may, if applicable, be hardened at the point 74, a design in which the end section 70 comprises metal carbide is preferred. Accordingly, starting from the end face 68, the body 60 is provided with a blind hole (not shown) in which, as an insert, the end section 70 is fastened coaxially with the body 60, e.g. using a soldered connection.

Directly following the above-described turning operation on the spectacle lens L, it is engraved on its prescription surface R by means of the graver 50 actuated by the second fast-tool assembly 38. Its position relative to the workpiece spindle 24, or more precisely, the position of the essentially punctiform end 51 of the graver 50 relative to the workpiece rotation axis B of the workpiece spindle 24 (in the x and z directions) and in the y direction have been previously calibrated. A calibration of this kind may, for example, take place in a manner such that, before workpieces are machined by the machine 10, a calibration component (not shown) is mounted in the holder for the workpiece spindle 24 in a manner such that the calibration component assumes a predetermined position in the x, y and z directions in the co-ordinate system of the machine 10. The calibration component is equipped with e.g. a spherical surface with a known spherical radius. To calibrate the graver 50, the workpiece spindle 24 is travelled by means of the Y-slide 22 into a predetermined y position, and secured there. The calibration component, held by the workpiece spindle 24 in a predetermined rotation-angle position about the workpiece rotation axis B, is then "probed" with the end 51 of the graver 50 at four or more points, separated from one another in the x direction, i.e. at four or more different x positions of the X-slide 18, and thereby of the workpiece spindle 24, the graver 50 is slowly advanced in the F2-axis by means of the second fast-tool assembly 38 until the end 51 of the graver 50 contacts the calibration component. This leads in each case to an increase in force at the shuttle 46, which is indirectly detectable by means of the measuring system (not shown) of the second fast-tool assembly 38; the particular F2 position of the shuttle 46, and thereby of the graver 50, at the moment of the force increase is stored in the control unit (not shown) of the machine 10. The contact position may e.g. also be determined by a momentary increase in the contouring error of the F2-axis, i.e. a momentary increase in the amount of difference between the required stroke of the shuttle 46 and its actual stroke, which is detected by CNC technology. After the probing of the four or more points, separated from one another in the x direction, on the spherical surface of the calibration component, the latter is rotated 180° by means of the workpiece spindle 24 in order to compensate any eccentricity of the spherical surface relative to the workpiece rotation axis B. A new probing of the calibration component at four or more points, separated from one another in the x direction, on the spherical surface of the calibration component takes place; the associated F2 position of the shuttle 46 is again stored. With a known position of the workpiece spindle 24 in the X, Y and B axes, and a known spherical radius of the surface of the calibration component, the (relative) position of the end 51 of the graver 50 in the co-ordinate system of the machine 10 can be calculated, in a manner familiar to the person skilled in the art, from the F2 positions thus determined and stored.

The engraving process which follows on directly from the above-described turning operation of the spectacle lens L now proceeds as follows. Also known in addition to the (relative) position of the end 51 of the graver 50 in the co-ordinate system of the machine 10 are the position at which the engraving is to be applied to the prescription surface R of the spectacle lens L, and the geometry of the prescription surface R processed on the spectacle lens L by means of the turning cutter 48. From these, the (engraving) positions for the X, Y and B axes are calculated. The positions in the X and B axes are derived from the polar co-ordinates of the engraving to be applied relative to the rotation axis of the spectacle lens L and its horizontals, i.e. the workpiece spindle 24 is displaced linearly by a defined amount, by means of the X-slide 18, in the X-axis according to the radial distance of the engraving to be applied relative to the rotation axis of the spectacle lens L, whilst the workpiece spindle 24 is rotated by a defined amount about the workpiece rotation axis B according to the angular position of the engraving to be applied relative to the rotation axis and horizontals of the spectacle lens L. The defined adjustment of the workpiece spindle 24 in the Y-axis by means of the Y-slide 22 takes place according to the thickness of the spectacle lens L at the location of the prescription surface R at which the engraving is to be applied, which is also known from the above information, in a manner such that a position in the Y-axis is reached at which the end 51 of the graver 50, linearly actuated by the second fast-tool assembly 38, contacts the prescription surface R just at the moment at which it "hits" against the X-Y plane containing the workpiece rotation axis B, or is located at its level. The depth of the engraving can be adjusted by appropriate (additional) advance of the graver 50 in the F2-axis.

As already mentioned at the start, the graver 50 can be moved high-dynamically by means of the second fast-tool assembly 38 in the direction of the spectacle lens L and away from it, wherein the end 51 of the graver 50 preferably strikes the prescription surface R needle-fashion in quick succession, like a woodpecker against a tree, whilst the impact point is changed by positioning of the spectacle lens L in the X and B-axes and, if applicable, in the Y-axis, according to the engraved image to be produced. As an alternative to this, the graver 50 may, however, also be used in a manner such that, in a position of the graver 50 at which its end 51 is in contact with the prescription surface R, the spectacle lens L is moved in the X and B-axes and, if applicable, in the Y-axis, without the graver 50 executing a needling movement, so that an engraved image is produced by "scribing" or "scratching".

Figure 8:
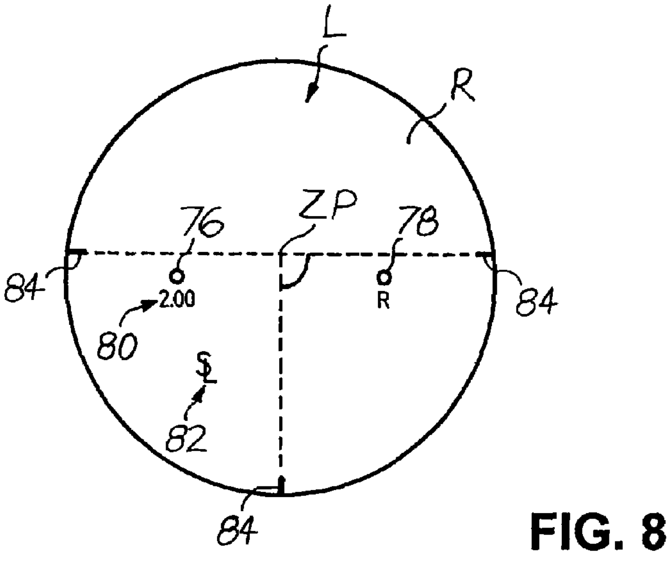
FIG. 8 is a plan view of a spectacle lens that has been permanently engraved by the machine according to the invention.

Finally, FIG. 8 shows, by way of example, a prescription surface R of the spectacle lens L engraved by the machine described above, wherein the broken lines located vertically in FIG. 8 do not belong to the engraving, but serve simply to elucidate the position of part of the engraving. The prescription surface R shown is a progressive surface with the permanent engraving required by DIN EN ISO 8980-2, which contains for alignment two e.g. circular markings 76, 78, 34 mm apart, on the lens horizontals running through the lens center point, wherein the latter lies precisely in the center between the two markings 76, 78. Below the marking 76, on the left in FIG. 8, is located the indication 80 of near-vision magnification, in the present example 2.00 dioptres, whilst the spectacle lens L is marked below the marking 78, on the right in FIG. 8, with "R" for right. Engraved at 82, finally, is the manufacturer identifier, in this case "SL". In addition, engraved at the edge of the prescription surface R of the prescription lens L are three lines 84, which indirectly indicate the center point ZP of the spectacle lens L, which is derived from joining the lateral lines 84 with a line from which a perpendicular falls to the bottom line in FIG. 8 (indicated in FIG. 8 with broken lines). This centring point ZP serves subsequently for the positioning of the spectacle lens L for edging according to the shape of the spectacle frame.

In summary, there is disclosed a machine for machining optical workpieces, in particular plastic spectacle lenses, which machine is equipped with a workpiece spindle, by which means the workpiece can be rotatably driven about a workpiece rotation axis, and with a first fast-tool assembly, by which means a turning cutter is movable in the direction of the workpiece and away from it, wherein the workpiece spindle and the first fast-tool assembly are, in addition, movable relative to each other in a direction transverse to the workpiece rotation axis. Provided adjacent to and preferably in parallel configuration with the first fast-tool assembly is a second fast-tool assembly with a graver, the end of which that faces the workpiece is essentially punctiform, wherein the graver is movable high-dynamically, by means of the second fast-tool assembly, in the direction of the workpiece and away from it, so that, in particular through needling engagement of the graver with the workpiece, a marking of any geometry can be produced on the latter in the same span.

Other variations and modifications are possible without departing from the scope and spirit of the present invention as defined by the appended claims.

We claim:

1. A machine for machining optical workpieces having a face to be machined, said machine comprising:

a workpiece spindle that can rotatably drive said workpiece about a workpiece rotation axis which passes through the face of said workpiece;

a first fast-tool assembly, that moves a turning cutter towards the face of said workpiece and away from the face of said workpiece;

said first fast-tool assembly comprising a first actuator and a first shuttle which is assigned to said first actuator and carries said turning cutter;

the workpiece spindle and the first fast-tool assembly being movable relative to each other in a direction transverse to the workpiece rotation axis;

a second fast-tool assembly positioned adjacent to the first fast-tool assembly and having a graver;

said second fast-tool assembly comprising a second actuator and a second shuttle which is assigned to said second actuator and carries said graver; and said graver terminating with a point that tapers towards an end which faces the face of said workpiece and is essentially punctiform, said graver having no cutting edge that is contiguous with the punctiform end, and wherein the graver is movable by the second fast-tool assembly towards the face of said workpiece and away from the face of said workpiece, so that, through needling engagement of the graver with the face of said workpiece, a marking can be produced on the face of said workpiece.

2. A machine as claimed in claim 1 further comprising:

the second fast-tool assembly with the graver being located to have a parallel configuration with the first fast-tool assembly.

3. A machine as claimed in claim 1 further comprising:

the graver being movable by the second fast-tool assembly in a fast-tool movement plane;

the workpiece spindle and the second fast-tool assembly being movable relative to one another in a plane that contains the workpiece rotation axis; and the fast-tool movement plane being positioned obliquely relative to the plane containing the workpiece rotation axis.

4. A machine as claimed in claim 3 wherein the fast-tool movement plane and the plane containing the workpiece rotation axis enclose a setting angle which lies between 2 ° and 10°.

5. A machine as claimed in claim 1 wherein the graver has a longitudinal axis and can be advanced with positioning control in the direction of the longitudinal axis by the second fast-tool assembly.

6. A machine as claimed in claim 1 wherein the point of the graver tapers essentially conically towards the end of the graver facing the face of said workpiece.

7. A machine as claimed in claim 1 wherein the point forming the end of the graver facing the face of said workpiece is comprised of metal carbide.

* * * * *